United States Patent [19]

Hosoya et al.

[11] Patent Number: 5,432,873

[45] Date of Patent: Jul. 11, 1995

[54] OPTICAL SWITCH

[75] Inventors: Toshifumi Hosoya; Yuji Kobayashi; Yasuo Matsuda; Tsuyoshi Nonaka, all of Kanagawa, Japan

[73] Assignee: Sumitomo Electric Industries, Ltd., Osaka, Japan

[21] Appl. No.: 943,874

[22] Filed: Sep. 11, 1992

[30] Foreign Application Priority Data

Sep. 12, 1991 [JP] Japan .................................. 3-233112
Jun. 29, 1992 [JP] Japan .................................. 4-170782

[51] Int. Cl.⁶ .............................................. G02B 6/00
[52] U.S. Cl. ...................................................... 385/21
[58] Field of Search ...................................... 385/16–24

[56] References Cited

U.S. PATENT DOCUMENTS 4,805,975  2/1989  Utaka et al. ............................ 385/16
5,080,931  1/1992  Trundle et al. ...................... 427/164
5,091,984  2/1992  Kobayashi et al. .................... 385/16

FOREIGN PATENT DOCUMENTS 0418654  3/1991  European Pat. Off. .
0433901  6/1991  European Pat. Off. .

OTHER PUBLICATIONS

"Patent Abstract of Japan Appl." vol. 13, No. 165 Apr. 20, 1989 The Patent Office Japanese Govt. pp. 51, 860.
"The Research and Study Report I" Japanese Electronic Industry Devel. Association, 1988.
"The Institute of Electronics, Information & Communication Engineers" The Summaries C-292 of The Lecturers at the Spring Convention 1991.
Patent Abstracts of Japan, Unexamined Applications, P. Fiel, vol. 11, No. 178, Jun. 6, 1987 The Patent Office Japanese Government, pp. 43, 584.
Patent Abstracts of Japan, Unexamined Applications, P. Field, vol. 13, No.165, Apr. 20, 1989 The Patent Office Japanese Government, pp. 51, 860.

Primary Examiner—Akm E. Ullah
Attorney, Agent, or Firm—Cushman Darby & Cushman

[57] ABSTRACT

An optical switch comprises a substrate, a first thin film layer formed on the substrate and including a first optical waveguide having a coupling portion and tapered portions therein, a clad layer formed on the thin film layer, a second thin film layer formed on the clad layer and including a second optical waveguide having a coupling portion and tapered portions, wherein a compound including a photochromic material is contained in the clad layer.

8 Claims, 8 Drawing Sheets

OPTICAL SWITCH

BACKGROUND OF THE INVENTION

1. Field of the Invention

The present invention relates to an optical switch, more particularly to a photochromic optical switch which is switchable by a small quantity of light.

2. Description of the Prior Art

There has been known various optical switches of an optical waveguide type. In one of the switches, optical waveguides are formed on an electrooptical crystal such as LiNbO$_3$. In another of the switches, the optical waveguides and electrodes are formed on a semiconductor substrate such as GaAs, and the refractive index of a part of the optical waveguides is changed by applying a voltage to the part, introducing an electrical current into the part, or the like, to switch an optical path over.

Figure 11:
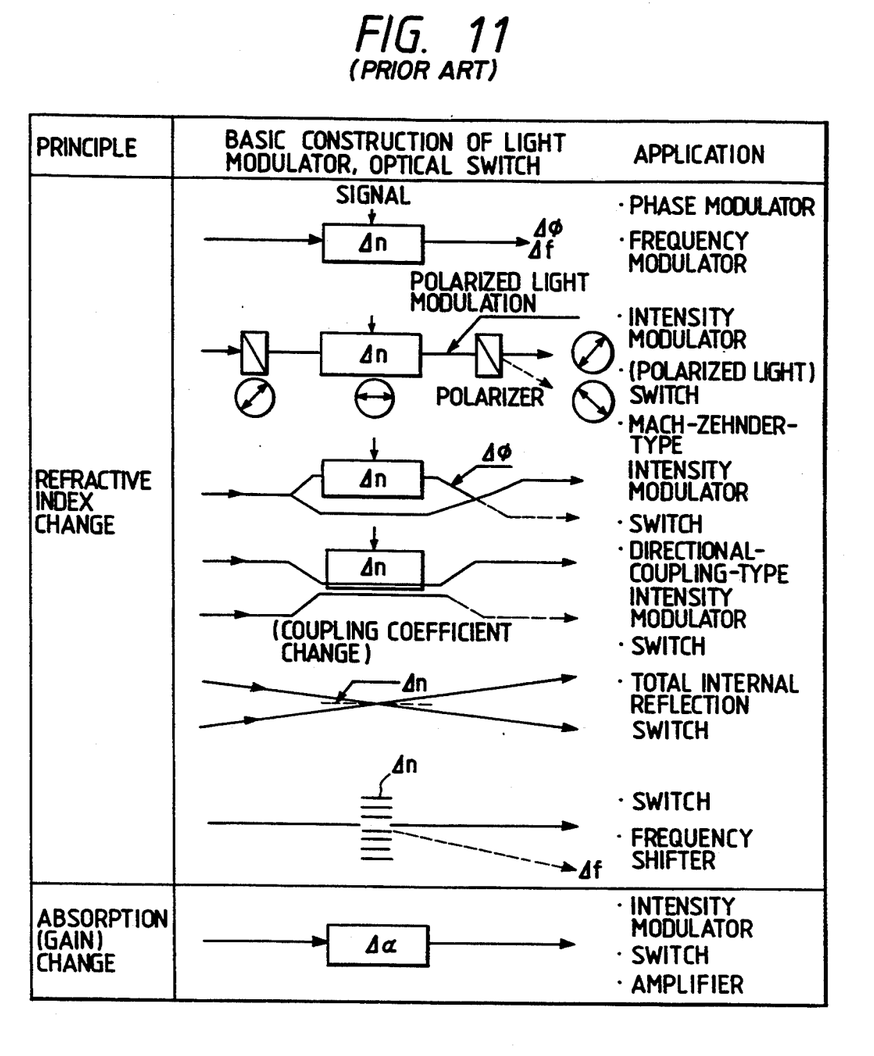
FIG. 11 is a tabular drawing illustrating the principle, basic construction and application of optical modulators and optical switches.

These optical switches of the optical waveguide type are shown in FIG. 11 and are described on page 92 of "The Research And Study Report I" regarding optical function devices, which was published by "The Japanese Electronic Industry Development Association" (hereinafter referred to as "Document 1") in 1988. In particular, an optical switch of an optical directional coupler type, and an optical switch of a total internal reflection type are being widely researched for the purpose of practical use.

Figure 12:
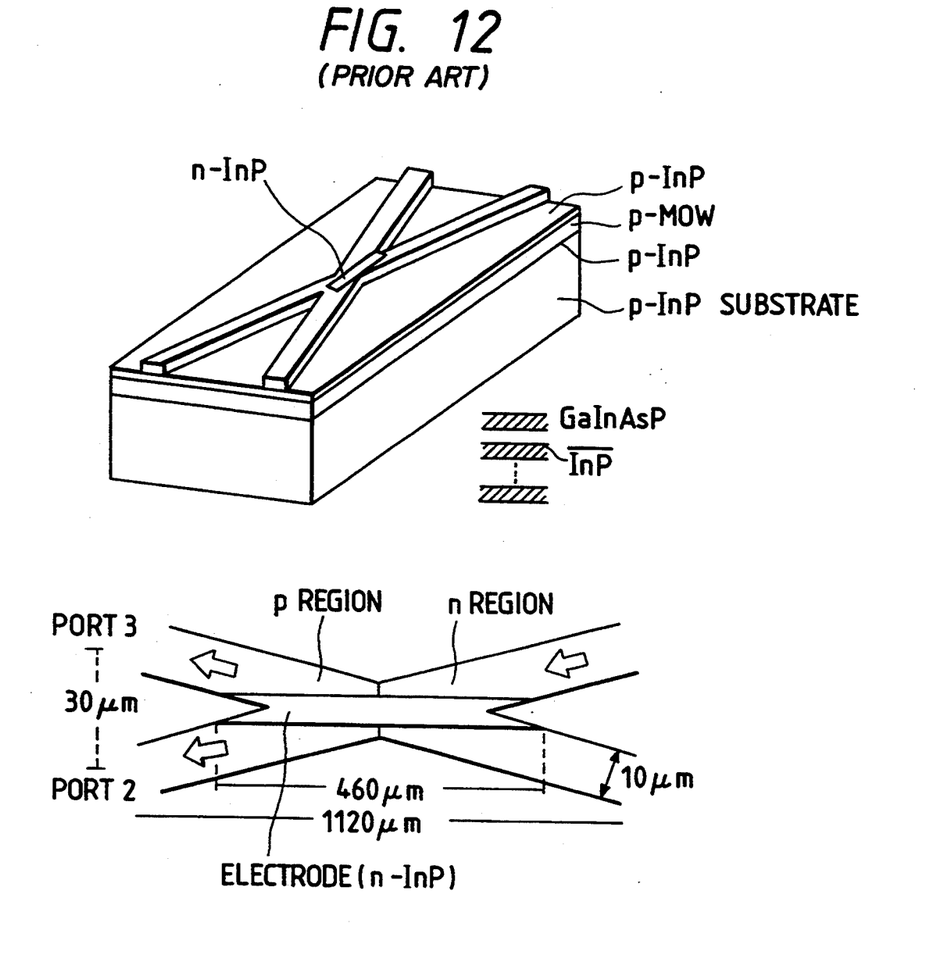
FIG. 12 is a structural views of a conventional optical switch or modulator of the GaInAsP/InP quantum-well intersectional type.

In a typical example of the optical switch of the total internal reflection type, an n-type semiconductor is embedded in X-intersecting portions of optical waveguides as shown in FIG. 12, and the refractive index of the intersecting portions is increased through electric field modulation to perform the switching by total internal reflection, as described on page 96 of Document 1.

Figure 13:
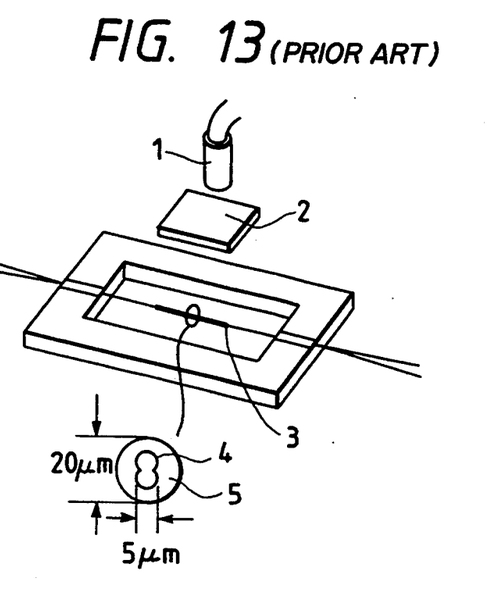
FIG. 13 is an exterior view of a conventional photochromic optical switch.
Figure 14:
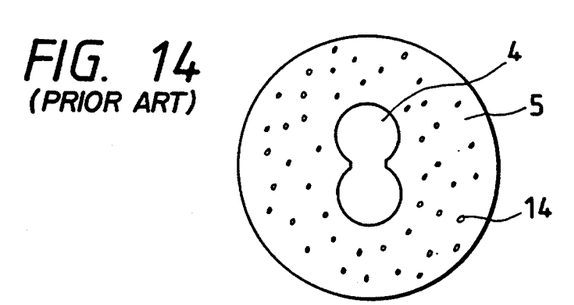
FIG. 14 is a sectional view of the switch shown in FIG. 13.

On the other hand, as an optical switch using a photochromic material, there has been known a conventional optical switch of an on/off type which utilizes the change in the absorbing action of the photochromic material. An optical switch utilizing the change in refractive index under the photochromic effect of the photochromic material is being developed recently. Further a photochromic optical switch using an optical fiber coupler was proposed in "The Summaries C-292 of The Lectures at the Spring Convention" (hereinafter referred to as "Document 2") of "The Institute of Electronics, Information & Communication Engineers" of Japan in 1991 the optical fiber coupler 15 shown in FIG. 13, and FIG. 14 shows a sectional view of the coupling portion of the switch shown in FIG. 13. The switch of FIGS. 13 and 14 includes a switching light source 1, a filter 2, the coupling portion 3 in which optical fibers are optically coupled to each other through fusion, and a clad layer 5 containing photochromic material 14.

Since the switch of the total internal reflection type shown in FIG. 12 and described in Document 1 requires a process of forming cores in a semiconductor substrate made of InP, GaAs or the like where other semiconductors all embedded in the substrate, it takes much time and trouble to manufacture such a switch, and the cost is high. Further, since the semiconductors are high in refractive index, the coupling loss due to boundary reflection is high when they are connected to optical waveguides or optical fibers of quartz glass.

On the other hand, the photochromic optical switch shown in FIG. 13 and described in Document 2 is easy to manufacture, and advantageous to connect to optical fibers. However, since the two optical fibers are coupled with each other through fusion in the coupling portion 3, as shown in FIG. 14, the coupling portion is coated with the clad layer 5. This clad layer is made of a compound which is variable in refractive index and which contains the photochromic material 14. This allows it to utilize the switching effect caused by the change in the refractive index around the coupling portion.

The region of the coupling portion 3 between two optical waveguides permits most of the power of switching light for the switch to pass through. Therefore, since the photochromic material 14 cannot be disposed in the region of the switch which has the optical fibers fused with each other, the switch cannot be sufficiently operated unless the thickness of the variably refractive compound is 10 $\mu$m or more at minimum. However, since the photochromic material 14 has a strong absorbing action at, and near, the wavelength of the switching light for photochromic reaction, in principle, the light is less likely to penetrate as deeply into the switch when the concentration of the material or the thickness of the layer 5 is increased to this level. For that reason, the quantity of the switching light needs to be made very large for switching.

SUMMARY OF THE INVENTION

The present invention was made in order to solve the problems described above.

Accordingly, it is an object of the present invention to provide an optical switch which is switchable by a small quantity of switching light. The above object has been achieved by provision of an optical switch in which a compound including a photochromic material is placed between two optical waveguides which are optically coupled to each other and which constitutes the optical coupling portion of an optical directional coupler.

In an example of the optical switch, a thin film layer having a coupling portion and tapered portions of a first optical waveguide, a clad layer, and a thin film layer of a second optical waveguide are sequentially formed on a substrate in an optical directional coupler of the optical waveguide type, wherein the thin film layer of the second optical waveguide includes both a coupling portion and tapered portions, and a compound including a photochromic material is contained in the clad layer.

In another example of the optical switch, a thin film layer having a coupling portion and tapered portions of two optical switches is formed on a substrate, and an intermediate layer in which a compound including a photochromic material exists is provided in the thin film layer across the coupling portion.

In yet another example of the optical switch, a photochromic material exists in a layer including the two optical waveguides of an optical directional coupler of an plane type, a photomask limiting illumination to a coupling portion for both the optical waveguides is provided on the layer, and a switching light source which can emit light of such wavelength as to be active to the photochromic material is provided over the photomask.

In the switch, a compound including a photochromic substance is present in a coupling portion for two light wave passages optically coupled to, and intersecting, each other.

Also, the above object of the invention has been achieved by provision of an optical switch in which a thin film layer having two optical waveguides intersecting each other is formed on a substrate, and an intermediate layer in which a compound including a photochromic material is formed in the thin film layer across the intersection of the two optical waveguides.

In an example of the optical switch of this type, a photochromic material exists in a layer including two optical guidewaves intersecting each other, a photomask limiting illumination to the intersection of the optical waveguides is provided on the layer, and a switching light source which can emit light of wavelengths which activate as to be active to the photochromic material is provided over the photomask.

It is preferable that the compound including the photochromic materials in each of the optical switches can change in refractive index by $5 \times 10^{-4}$ or more in the range of wavelength of communication light, and hardly absorbs the light in the range. It is also preferable that the compound is a high-molecular substance including the photochromic material dispersed therein.

DETAILED DESCRIPTION OF THE PREFERRED EMBODIMENTS

The optical switches according to embodiments of the present invention will be described with reference to the drawings attached hereto.

Figure 1:
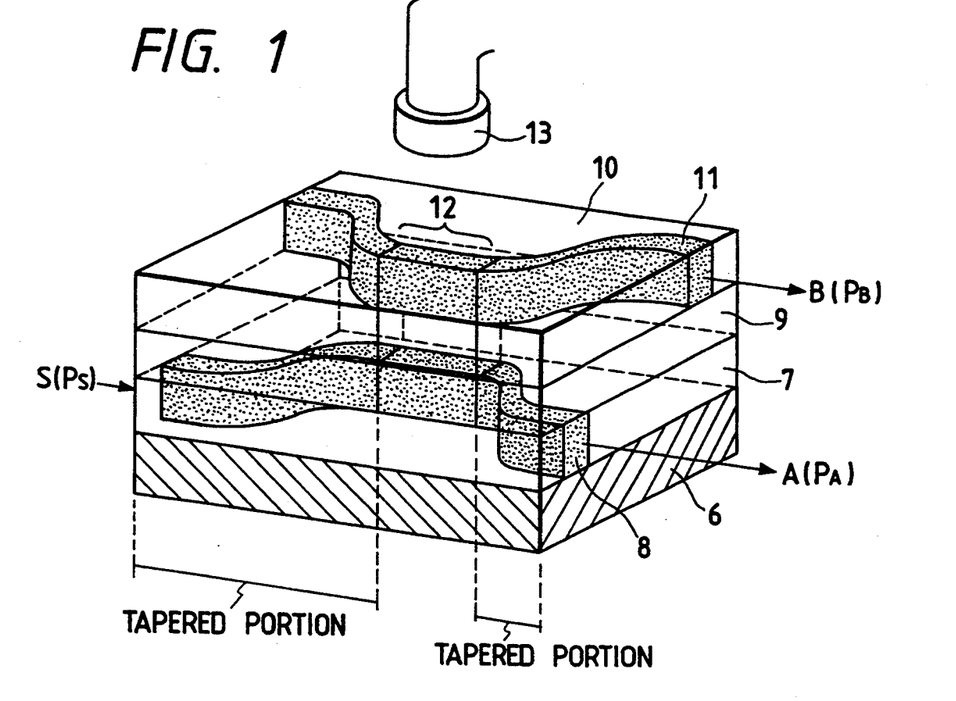
FIG. 1 is a structural view of an optical switch according to an embodiment of the present invention.

FIG. 1 shows an optical switch according to an embodiment of the present invention. The optical switch includes a substrate 6, a thin film layer 7 which constitutes a clad layer, a first optical waveguide 8 which constitutes a core included in the thin film layer 7, a clad layer 9 containing a photochromic material 14, a thin film layer 10, a second optical waveguide 11 which constitutes a core and which is included in the thin film layer 10, and a switching light source 13 for photochromic operation. The first and second optical waveguides 8 and 11 provide respective coupling portions 12. In this description, the term "tapered portions" means portions of two optical waveguides at which the two optical waveguides are gradually apart farther from each other, and which exist at both sides of the optical waveguides.

Figure 2:
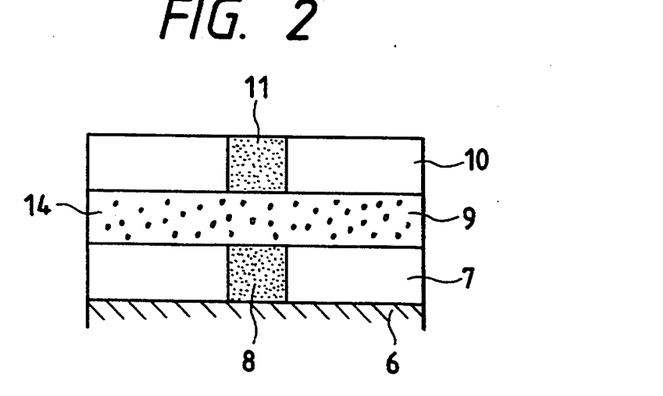
FIG. 2 is a sectional view of the switch shown in FIG. 1.

FIG. 2 shows a sectional view of the optical switch of FIG. 1. As seen from FIG. 2, since the photochromic material 14 is arranged between the coupling portions 12 of the optical waveguides 8 and 11, it can be very efficiently switched. For that reason, the concentration of the photochromic material 14 and the thickness of the clad layer 9 including the photochromic material 14 can be reduced to make it possible to perform the switching even by a small quantity of switching light.

Figure 3:
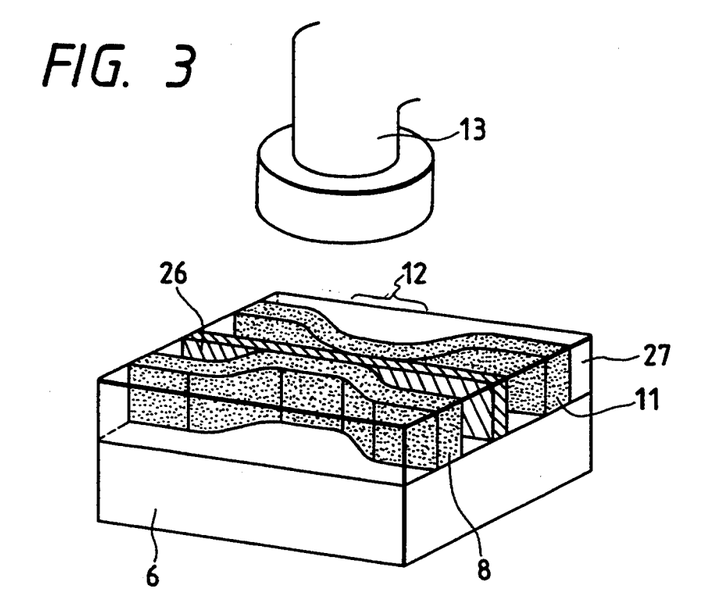
FIG. 3 is a structural view of an optical switch according to another embodiment of the invention.

FIG. 3 shows an optical switch according to another embodiment of the invention. The optical switch includes a substrate 6, an intermediate layer 26 including a photochromic material 14, a thin film layer 27 including a first optical waveguide (core) 8 and a second optical waveguide (core) 11, and a switching light source 13. Reference numeral 12 designates a coupling portion for both the optical waveguides 8 and 11.

Figure 4:
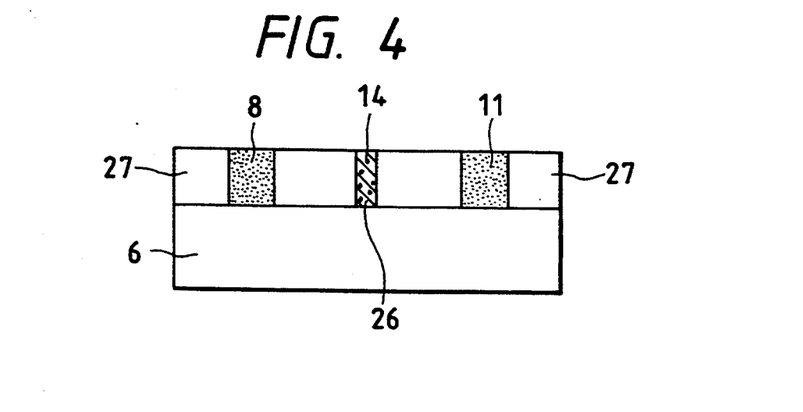
FIG. 4 is a sectional view of the switch shown in FIG. 3.

FIG. 4 shows a sectional view of the optical switch of FIG. 3. As is apparent from FIG. 4, since the photochromic material 14 is arranged between both the optical waveguides 8 and 11, it can be very efficiently switched. However, because the thin film layer 27 including the optical waveguides 8 and 11 is cut and the intermediate layer 26 including the photochromic material 14 is then embedded in the cut portion in order to form the intermediate layer 26 containing the photochromic material 14 within the thin film layer 27, the manufacturing process of the switch is more complicated.

If such manufacturing is to be less complicated, a clad layer including the photochromic material is preferably arranged between two optical waveguides in the form of a sandwich, as shown in FIG. 1. In this manufacturing method, since the clad layer including the photochromic material is formed not through the cutting of a thin film layer including optical waveguides but through mere stacking, the manufacturing is more simplified.

Figure 5:
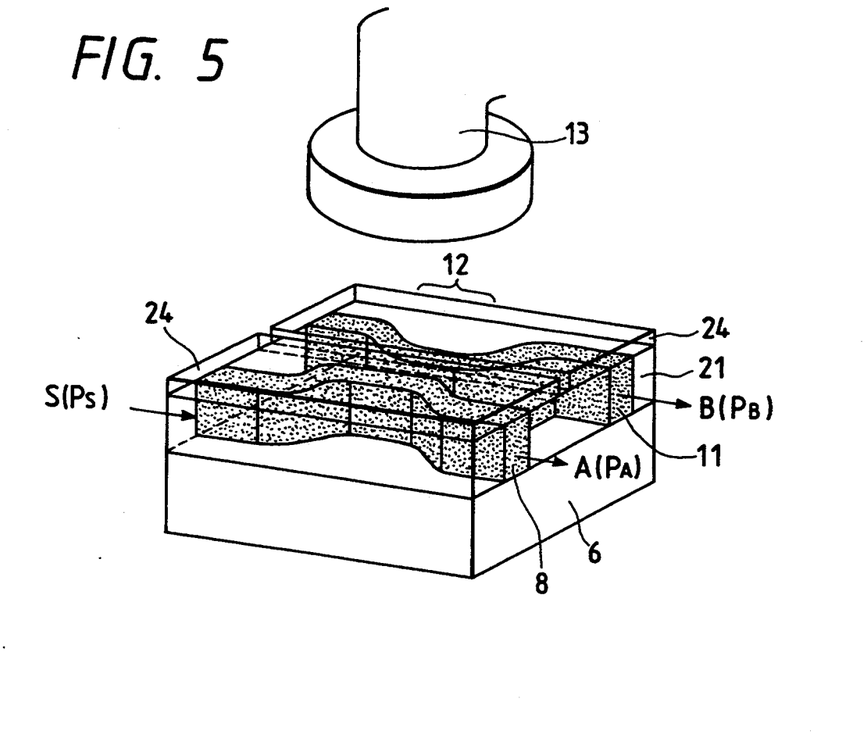
FIG. 5 is a structural view of an optical switch according to yet another embodiment of the invention.
Figure 6:
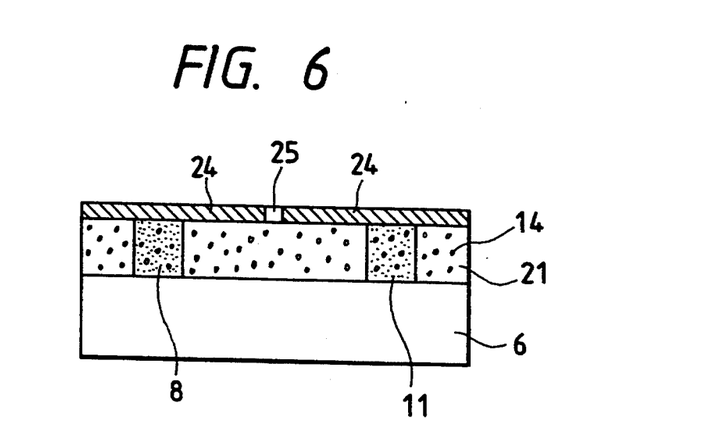
FIG. 6 is a sectional view of the switch shown in FIG. 5.

FIG. 5 shows an optical switch according to still another embodiment of the invention. The optical switch includes a substrate 6, a thin film layer 21 including a photochromic material 14, two optical waveguides 8 and 11 which are cores included in the thin film layer 21, photomask layers 24 through which the light cannot pass, a slit 25 provided between the photomask layers 24 and located on the top of a coupling portion 12 of the thin film layer 21, and a switching light source 13. In this embodiment, although the optical waveguides 8 and 11 extend on an identical plane as well as the optical switch shown in FIG. 3, the switches can simply be manufactured. That is, as shown in FIGS. 5 and 6, the thin film layer 21 including therein the optical waveguides 8 and 11 with the coupling portion 12 and the tapered portions is first formed on the substrate 6, and the photochromic material 14 is previously contained in the entire thin film layer 21 including the optical waveguides 8 and 11. Then, the photomask layers 24 are formed on the top of the thin film layer 21 so that the slit 25 is provided between the photomask layers 24 in order to transmit switching light from the light source 13 to the coupling portion 12 only between the optical waveguides 8 and 11 through the slit 25. With such a manufacturing method, virtually the same switching operation is enabled in the switch as in the switch of FIG. 3, without adopting a manufacturing process of cutting the thin film layer 21 and then embedding the photochromic material 14 in the cut portion.

Figure 7:
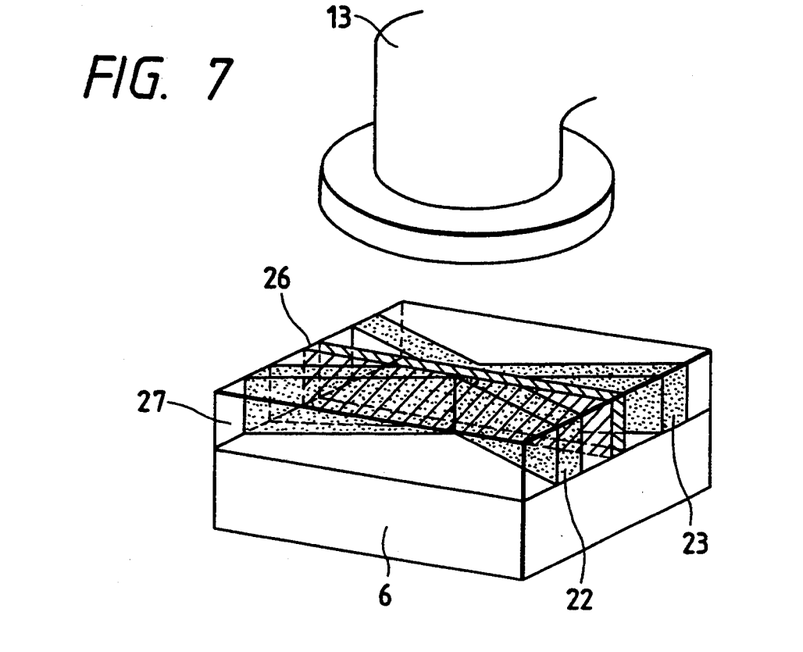
FIG. 7 is a structural view of an optical switch according to yet another embodiment of the invention.
Figure 8:
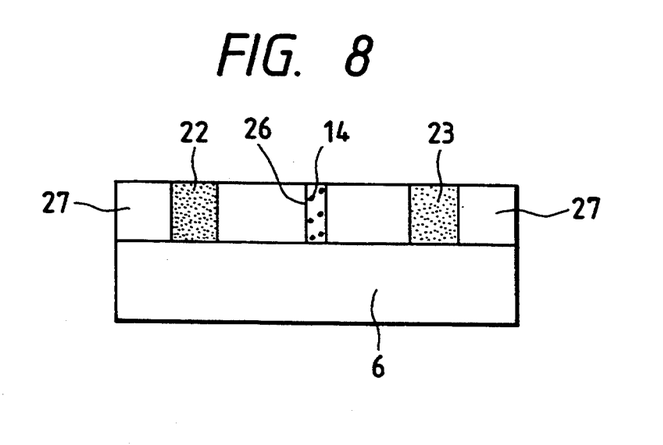
FIG. 8 is a sectional view of the switch shown in FIG. 7.

FIG. 7 shows an optical switch according to still another embodiment of the invention, which includes a substrate 6, a first optical waveguide 22 which is a core, a second optical waveguide 23 which is a core, an intermediate layer 26 containing a photochromic material 14, a thin film layer 27 including the first and second optical waveguides 22 and 23 intersecting each other, and a switching light source 13. The photochromic material 14 is embedded in the intersection of the optical waveguides 22 and 23. Since the photochromic material 14 is disposed between the optical waveguides 22 and 23 as shown in FIG. 8, it can be very efficiently switched. For that reason, the concentration of the photochromic material 14 and the thickness of the thin film layer 27 can be made smaller than those in the conventional optical switch shown in FIG. 13. As a result, the switching can be performed even by a smaller quantity of switching light.

In this embodiment, since the thin film layer 27 including the optical waveguides 22 and 23 are cut, and the intermediate layer 26 including the photochromic material 14 is then formed in the space left as a result of the cutting in order to form the intermediate layer containing the photochromic material in the thin film layer including the optical waveguides, the manufacturing of the switch is more complicated.

Figure 9:
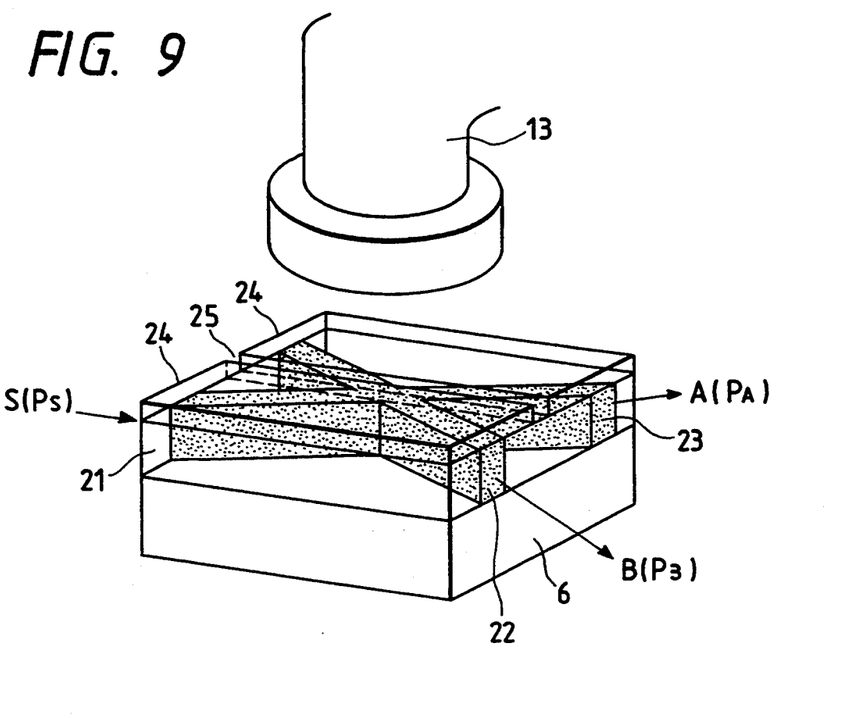
FIG. 9 is a structural view of an optical switch according to yet another embodiment of the invention.
Figure 10:
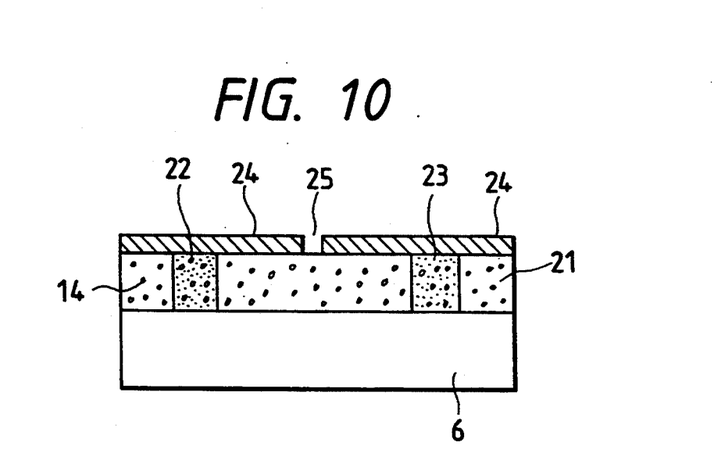
FIG. 10 is a sectional view of the switch shown in FIG. 9.

An optical switch which is of the same type as that of FIGS. 7 and 8 and also makes such manufacturing less complicated is shown in FIGS. 9 and 10. The switch includes a substrate 6, a thin film layer 21 containing a photochromic material 14, a first optical waveguide 22 which is a core included in the thin film layer 21, a second optical waveguide 23 which is a core included in the layer 21, photomask layers 24 through which light cannot pass, a slit 25 provided between the photomask layers and located on the top of the intersection of the optical waveguides 22 and 23, and a switching light source 13. In the manufacturing of the optical switch thus organized, the photochromic material 14 is previously contained in the entire thin film layer 21 including the optical waveguides 22 and 23, and the photomask layers 24 are then formed on the top of the thin film layer 21 so that the switching light can be transmitted from the light source 13 to the thin film layer 21 only at the intersection of the optical waveguides 22 and 23 through the slit 25. As a result, virtually the same switching operation is enabled in the switch as in the optical switch of FIG. 7, without adopting a manufacturing process of cutting the thin film layer 21 and then embedding the photochromic material in the cut portion.

It is preferable that the photochromic material used in the optical switch of the present invention absorbs less light in the range of wavelength for communication, which differs from an optical switch of the turned-on/off type. This is because a transmission loss increases due to the absorption. It is also preferable that the transmittance of the communication light through the clad layer including the photochromic material in each of the optical switches of the present invention is 70% or more for the general use of the switch. It is ideal that the transmittance is 95% or more for the use. If the transmittance is less than 70%, the communication light being transmitted through the switch is much damped to make it likely to cause a trouble in the practical use of the switch.

The wavelength of the communication light is generally the band of 0.85 $\mu$m, 1.30 $\mu$m, or 1.55 $\mu$m.

The change $\Delta n$ in the refractive index of the clad layer including the photochromic material used in the present invention is preferably selected to $5 \times 10^{-4}$ at minimum, and more preferably to $1 \times 10^{-3}$, in the range of wavelength of the communication light in order to attain adequate switching. All the kind of photochromic materials as far as they meet the above-mentioned conditions can be used in the optical switch of the present invention. For example, the photochromic material is a derivative of fulgide, anthracene, azobenzene, hydrazine, oxazone, diarylethene, salicylaldehyde, spiropyran, biimidazolyl, and cyclophan.

Also, the compound layer including the photochromic material which can be used in the optical switch of the present invention is made of polymethyl methacrylate, polystyrene, acrylate fluoride resin, urethane acrylate resin, polyvinylidene fluoride, silicone resin, and ladder-type silicone resin.

Further, in the optical switch of the present invention, the concentration of the photochromic material in the compound layer is generally 5% to 50% by weight. It is preferable that the thickness of the compound layer in the direction of the transmission of the switching light in the optical switch is 10 $\mu$m or less. If the thickness is more than 10 $\mu$m, it takes too much time to perform the switching operation. It is also preferable that the thickness of the compound layer sandwiching both the optical waveguides is 2 $\mu$m or more. If the thickness is less than 2 $\mu$m, it is so close to the wavelength of the communication light that the photochromic operation of the switch is incomplete.

(EXAMPLES)

Actual examples 1, 2 and 3 according to the above-described embodiments of the present invention will be described in detail.

(Example 1)

The optical switch shown in FIG. 1 was manufactured in such a manner that the substrate 6 was made of a sheet of silica glass and a film of polymethyl methacrylate applied to the sheet and having a refractive index of 1.49 and a thickness of 30 $\mu$m, and the thin film layer 7 including the first optical waveguide 8, the clad layer 9 including the photochromic material 14, and the other thin film layer 10 including the second optical waveguide 11 were sequentially formed on the substrate 6. The thin film layers 7 and 10 and the optical waveguides 8 and 11 were formed according to a method described on pages 37 and 38 of "The Research Group Report OQE88-91 of the Institute of Electronics, Information & Communication Engineers" of Japan. In the method, a photomask was used to form each thin film layer having a thickness of 5 $\mu$m and an optical waveguide pattern whose refractive index $n_1$ is 1.59 and whose change $\Delta n$ in refractive index is 0.01. Fulgide, which is a photochromic compound, was dissolved in a mixture of polystyrene and polymethyl methacrylate. The solution was diluted with toluene, and then applied to the thin film layer 7 in a spin-application method, so that the clad layer 9 was formed thereon. The clad layer 9 was 5 μm in thickness, $1 \times 10^{-3}$ in refractive index change An at the communication light wavelength of 1.3 μm, and 90% in transmittance thereat.

When light of 1.3 μm in wavelength and $P_S$ in power was introduced into the optical waveguide 8 from one side (S in FIG. 1) of the optical switch thus organized, the power $P_A$ of light from the output side A of the switch and that $P_B$ of light from the other output side B thereof were measured. As a result, it was found out that the ratio of branching of the power $P_S$ of the introduced light to the output sides A and B was 1 for the power $P_A$ of the light from the output side A by 0 for that $P_B$ of the light from the other output side B, in the initial state of the switch. Under the condition, in not more than 0.1 second after switching light of 325 nm in wavelength and 10 mW/cm² in power was then introduced from the switching light source 13 into the switch, it was switched so that the ratio of branching of the power $P_S$ to the output sides A and B became 0 for the power $P_A$ of the light from the output side A by 1 for that $P_B$ of the light from the other output side B.

(Example 2)

The optical switch shown in FIG. 5 was manufactured in such a manner that the substrate 6 was made of a sheet of silica glass and a film of polymethyl methacrylate applied to the sheet and having a refractive index of 1.49 and a thickness of 30 μm. Fulgide, which is a photochromic compound, bisphenol-Z-like polycarbonate, methyl acrylate, benzoin ethyl ether, and hydroquinone were dissolved in methylene chloride. The solution was applied to the substrate 6 in a spin-application method so that the thin film layer 21 having a thickness of 5 μm and including the photochromic material was formed on the substrate. The two light optical waveguides 8 and 11 having an optical-coupler-type pattern whose core refractive index $n_1$ were 1.59 and whose change An in the refractive index was 0.01 were then formed in the thin film layer 21 through the use of a photomask in the method described in the pages 37 and 38 of the above-mentioned report. A film of polyimide, which is a photoresist, was then formed on the thin film layer 21 in a spin-application method, and exposed to light through a photomask except on a part of the film, which corresponded to the slit 25. The part not exposed to the light was then washed off so that polyimide layers each of 5 μm in width and 5 μm in thickness were formed on the thin film layer 21. A thin silver film of 0.5 μm thickness was then formed on each polyimide layer by vacuum evaporative deposition. Finally, the polyimide layers were washed off so that the photomask layers 24 were formed on the thin film layer 21, and the slit 25 of 5 μm in width was formed between the photomask layers, on the coupling portion of the thin film layer, as shown in FIG. 5.

When light of 1.3 μm in wavelength and $P_S$ in power was introduced into the optical waveguide 8 at one side (S in FIG. 5) thereof, the power $P_A$ of light from the output side A of the switch and that $P_B$ of light from the other output side B thereof were measured. As a result, it was found out that the ratio of branching of the power $P_S$ of the introduced light to the output sides A and B was 1 for the power $P_A$ of the light from the output side A by 0 for that $P_B$ of the light from the output side B, in the initial state of the switch. In not more than 0.1 second after switching light of 325 nm in wavelength and 10 mW/cm² in power was then introduced from the switching light source 13 into the switch, it was switched so that the ratio of branching of the power $P_S$ to the output sides A and B became 0 for the power $P_A$ of the light from output side A by 1 for that $P_B$ of the light from the other output side B.

(Example 3)

The optical switch shown in FIG. 9 was manufactured in such a manner that the substrate 6 was made of a sheet of silica glass and a film of polymethyl methacrylate and having a refractive index of 1.49 and a thickness of 30 μm. Fulgide, which is a photochromic compound, bisphenol-Z-like polycarbonate, methyl acrylate, benzoin ethyl ether, and hydroquinone were dissolved in methylene chloride. The solution was applied to the substrate 6 in a spin-application method so that the thin film layer 21 including the photochromic substance and having a thickness of 5 μm was formed on the substrate. The two optical waveguides 22 and 23 having an intersecting optical waveguide pattern whose core refractive index $n_1$ was 1.59 and whose change An in the refractive index was 0.01 in the index were then formed in the thin film layer 21 through the use of a photomask in the method described in the above-mentioned report. A film of polyimide, which is a photoresist, was then formed on the thin film layer 21, and exposed to light through a photomask except on a part of the film, which corresponded to the slit 25. The part not exposed to the light was washed off so that polyimide layers each of 5 μm in width and 5 μm in thickness were formed on the thin film layer 21. A thin silver film of 0.5 μm in thickness was then formed on each polyimide layer by vacuum evaporative deposition. Finally, the polyimide layers were washed off so that the photomask layers 24 were formed on the thin film layer 21, and the slit 25 of 5 μm in width was formed between the photomask layers, on the intersection of the optical waveguides 22 and 23.

When light of 0.85 μm in wavelength and $P_S$ in power was introduced into the optical guides 23 at one side thereof (S in FIG. 9), the power $P_A$ of light from the output side A of the switch and that $P_B$ of light from the other output side B thereof were measured. As a result, it was found out that the ratio of branching of the power $P_S$ of the introduced light to the output sides A and B was 1 for the power $P_A$ of the light from the output side A by 0 for that $P_B$ of the light from the other output side B, in the initial state of the switch. In not more than 0.1 second after switching light of 325 nm in wavelength and 10 mW/cm² in power was then introduced from the switching light source 13 into the switch, it was switched so that the ratio of branching of the power $P_S$ to the output sides A and B became 0 for the power $P_A$ of the light from the output side A by 1 for that $P_B$ of the light from the other output side B.

(Comparison Example)

Figure 15:
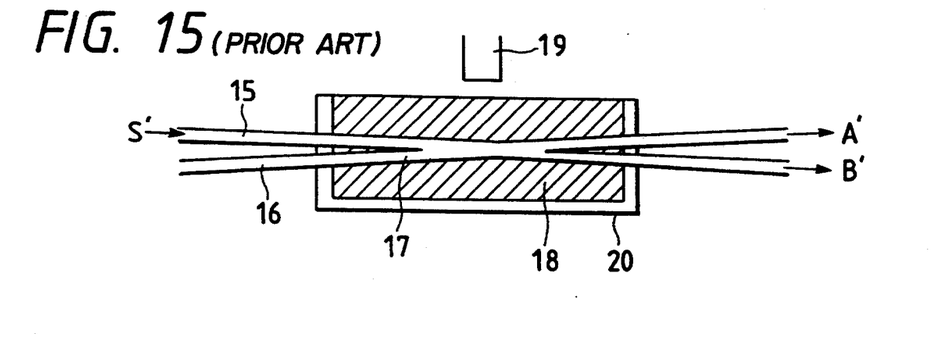
FIG. 15 is a sectional view of a conventional photochromic optical switch for comparison with the embodiments.

FIG. 15 shows a conventional optical switch having an optical fiber coupler as an optical directional coupler, and a photochromic compound as a compound surrounding the optical coupling portion of the coupler. The switch was manufactured in such a manner that it includes optical fibers 15 and 16 belonging to the optical fiber coupler, a tapered coupling portion 17 which was formed so that the two fibers were coupled to each other through fusion and elongation or through the like, a clad layer 18 including the photochromic compound, a light irradiator 19 for changing the optical paths of the switch for each other, and a casing 20. To form the clad layer 18, fulgide, which was the photochromic compound, was dissolved in an unhardened acrylate fluoride resin low in refractive index, and the solution was poured into the casing 20 and hardened. The clad layer 18 was 20 μm in thickness, and the change an in the refractive index was $5 \times 10^{-3}$ at the light wavelength of 1.3 μm When light of 1.3 μm in wavelength and $P_S$ in power was introduced into the optical fiber 15 at one end thereof (S' in FIG. 15), the power $P_{A'}$ of light from the output side A' of the switch that $P_{B'}$, of light from the other output side B' thereof were measured. As a result, it was found out that the ratio of branching of the power $P_{S'}$, of the introduced light to the output sides A' and B' was 1 for the power $P_{A'}$, of the light from the output side A by 0 for that $P_{B'}$ of the light from the other output side B'. In more than 1 minute after switching light of 325 nm wavelength and 10 mW/cm² in power was then introduced from the light irradiator 19 into the switch, it was not switched. In not more than 0.1 second after switching light of 325 nm in wavelength and 100 mW/cm² in power was then introduced from the light irradiator 19 into the switch, it was switched so that the ratio of branching of the power $P_{S'}$, to the output sides A' and B' was 0 for the power $P_{A'}$, of the light from the output side A' by 1 for that $P_{B'}$, of the light from the other output side B'.

As was described above, since an optical switch provided in accordance with the present invention can be switched even by a small quantity of switching light, the switch does not require a switching light source as high in power and an expensive laser light source. As a result, a switching system very compact and cheap as a whole can be constituted.

What is claimed is:

1. An optical switch comprising:
   a substrate;
   a first thin film layer formed on said substrate and including a first optical waveguide therein;
   a clad layer formed on said first thin film layer containing a photochromic material; and
   a second thin film layer formed on said clad layer and including a second optical waveguide for optically coupling with said first optical waveguide,
   wherein said first and second optical waveguides each have a coupling portion and a tapered portion.

2. An optical switch comprising:
   a first optical waveguide;
   a second optical waveguide for optically coupling with said first optical waveguide;
   a layer between said first and second optical waveguides and containing a photochromic material therein;
   a photomask which is provided on said layer for limiting illumination to a coupling portion of said first and second optical waveguides; and
   a switching light source provided over said photomask for emitting light having wavelengths which are active to said photochromic material.

3. An optical switch, comprising:
   first and second optical waveguides intersecting each other at an intersection portion thereof;
   a layer between said first and second optical waveguides and containing a photochromic material therein;
   a photomask which is provided on said layer for limiting illumination to the intersection of said first and second optical waveguides; and
   a switching light source provided over said photomask for emitting light having wavelengths which activate said photochromic material.

4. An optical switch, comprising:
   first optical waveguide;
   second optical waveguide for optically coupling with said first optical waveguide; and
   a compound including a photochromic material between said first and second optical waveguide which absorbs less light in the range of wavelengths of communication light, where it can change in refractive index by at least $5 \times 10^{-4}$.

5. An optical switch comprising:
   first and second optical waveguides which intersect each other;
   a layer between said first and second optical waveguides, said layer containing a compound including a photochromic material;
   a photomask provided on said layer for limiting illumination to the intersection of said first and second optical waveguides; and
   a switching light source provided over said photomask for emitting light having wavelengths which activate said photochromic material,
   wherein the compound including said photochromic material absorbs less light in the range of wavelengths of communication light where said compound has a change in refractive index of at least $5 \times 10^{-4}$, and
   wherein the compound is a high-molecular material.

6. An optical switch, comprising:
   a first optical waveguide;
   a second optical waveguide for optically coupling with said first optical waveguide; and
   a compound, fabricated from a high-molecular material, which includes a photochromic material and which is positioned between said first and said second optical waveguides, where said compound absorbs less light in the range of wavelengths of communication light and has a change in refractive index of at least $5 \times 10^{-4}$.

7. An optical switch, comprising:
   an optical coupling portion of an optical direction coupler including two optical waveguides; and
   a compound, fabricated from a high-molecular material, which contains a photochromic material and which is positioned between said two optical waveguides, where said compound absorbs less light in the range of wavelengths of communication light and has a change in refractive index of at least $5 \times 10^{-4}$.

8. An optical switch, comprising:
   first and second optical waveguides intersecting each other at an intersection portion thereof; and
   a compound, fabricated from a high-molecular material, which contains a photochromic material and which is positioned in said intersection portion of said first and second optical waveguides, where said compound absorbs less light in the range of wavelengths of communication light and has a change in refractive index of at least $5 \times 10^{-4}$.

* * * * *